Aug. 5, 1958 — J. N. BROPHY — 2,846,152
DISPOSER
Filed Feb. 8, 1954 — 2 Sheets-Sheet 1

Inventor
James N. Brophy
by Roberts, Cushman & Grover
Att'ys.

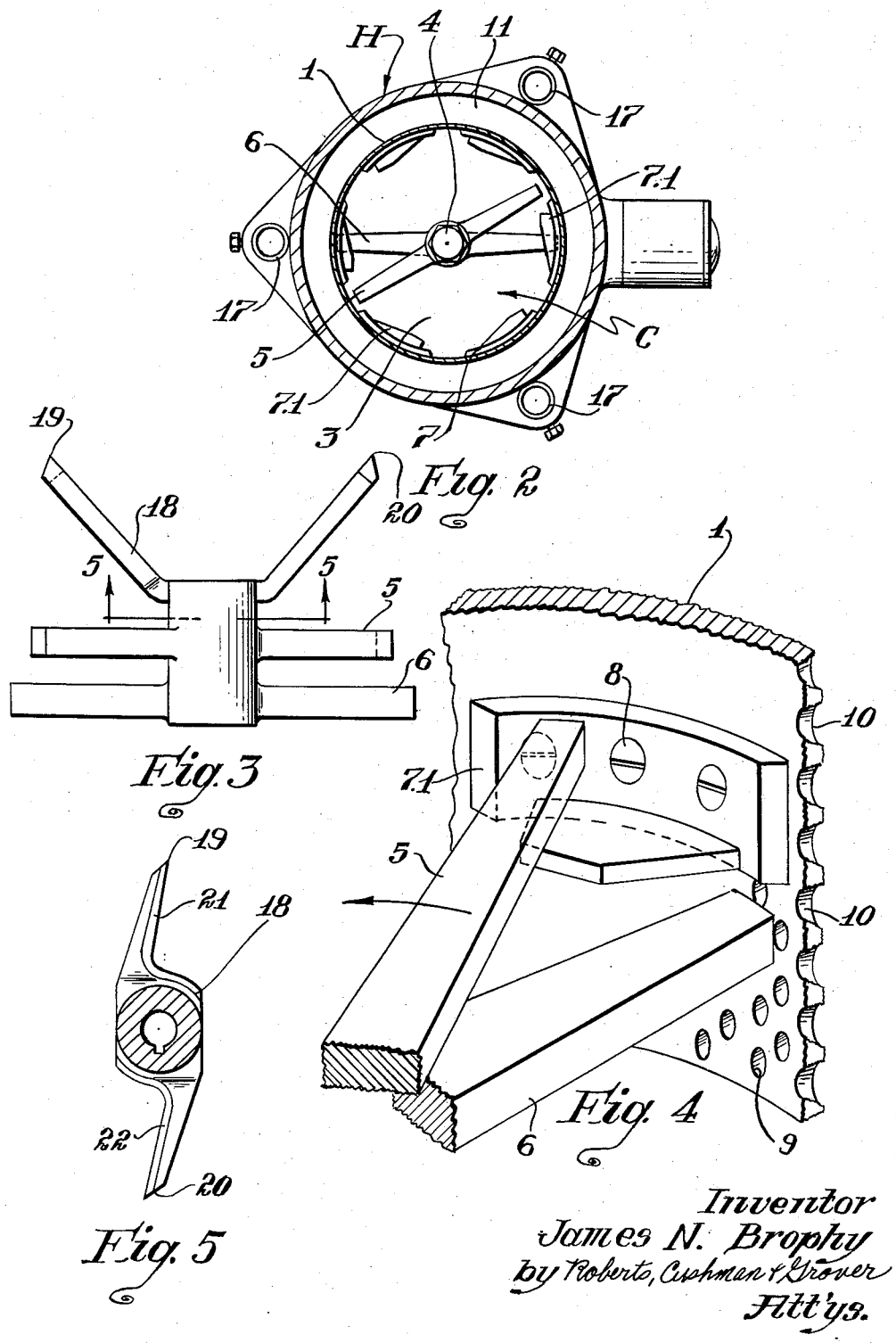

United States Patent Office 2,846,152
Patented Aug. 5, 1958

2,846,152

DISPOSER

James N. Brophy, Wakefield, Mass.

Application February 8, 1954, Serial No. 408,829

6 Claims. (Cl. 241—43)

The present invention relates to a disposer device and more particularly to a garbage disposer designed for heavy duty performance.

Heretofore a number of disposer devices have been proposed, but these have been subject to certain disadvantages which the improved apparatus of the present invention overcome. In some of these known devices the inlet for the waste material has been such as to result in difficulty and inconvenience in feeding the waste into the comminuting chamber as a result of the hopper and/or passage being of improper size. In others the comminuting means have been incapable of digesting all kinds of waste material, even when designed for heavy duty, and have been unable to reduce the harder materials such as bone, gristle, shells and the like. Some devices fail to supply the water, which is used during the comminuting of solid matter and for flushing out the device after use, in an easy and effective manner. Others fail to provide proper outlets for reduced matter, and, as a result, such matter mats in the comminuting chamber and thereby reduces the efficiency of the device. Certain of these devices are unable to handle effectively material such as grapefruit rinds which, when dropped into the comminuting chamber, tend to remain in the chamber on top of an axially positioned rotatable shaft, thereby reducing the efficiency of the device, causing needless delay in the comminuting time. Some devices are provided with cutter means which are so arranged that the work load is improperly balanced, often resulting in excessive vibration and uneven wear of the parts. While still others provide but one directional cutting, for instance on a horizontal plane, and thereby limit communiting efficiency, encourage matting, and slow ultimate disposition of the waste matter.

Therefore it is an object of the present invention to provide a disposer device having a hopper and passage to the comminuting chamber of proper sizes so as to provide maximum efficiency in regard to the flow of waste material into the comminuting chamber. Another object is to provide a device with comminuting means capable of easily digesting harder materials such as a bone, gristle, shells, and the like. Another object is to provide a device in which water, that is used during comminuting and in flushing out the device, is easily and effectively provided. A further object is to provide a device in which the reduced waste or garbage may be evenly and continuously removed from the comminuting chamber while the comminuting operation is being carried on, thereby preventing matting and maintaining a high operating efficiency. A still further object is to provide optional means for preventing materials such as grapefruit rinds and the like from avoiding the action of the cutting means by "riding" on top of an axially positioned rotatable shaft and thus delaying the disposition of the solid waste matter. Another object is to provide a device in which the cutting means are so arranged that the work load is uniformly maintained, thereby reducing vibration and uneven wear of the parts. Still another object is to provide two-directional cutting, thereby decreasing the time for comminuting and ultimate disposition of the ground garbage. These and further objects and advantages will appear obvious as the disclosure proceeds.

According to the present invention a disposer device is provided with a comminuting chamber comprising a perforate cylindrical screen having a substantially open top, closed bottom, and an axially positioned rotatable shaft positioned therein. Mounted on said shaft is a rotor, and extending inwardly from said screen are means for forming a cutting edge. A leading edge of the rotor and the inwardly extending edge of the cutting means are in cooperative relation for comminuting solid matter coming between said edges. The perforations of the screen through which comminuted solid matter is removed from the chamber define a multiplicity of cutting edges, and are in close relation with one end of the rotor, the relation providing a means to further comminute said matter between said end and the cutting edges of the perforations. The device is further provided with means for driving the shaft and rotor.

While some of the more salient features, characteristics and advantages of the present invention have been pointed out above, others will become apparent from the following disclosure of a preferred embodiment taken in conjunction with the accompanying drawing in which:

Fig. 2 is a section on line 2—2 of Fig. 1;

Fig. 3 is a front elevation of a modified rotor bar assembly;

Fig. 4 is an isometric view of a portion of the perforate cylinder wall, a portion of the offset rotor bars, and a lower cutter; and Fig. 5 is a section on line 5—5 of Fig. 3.

Figure 1:
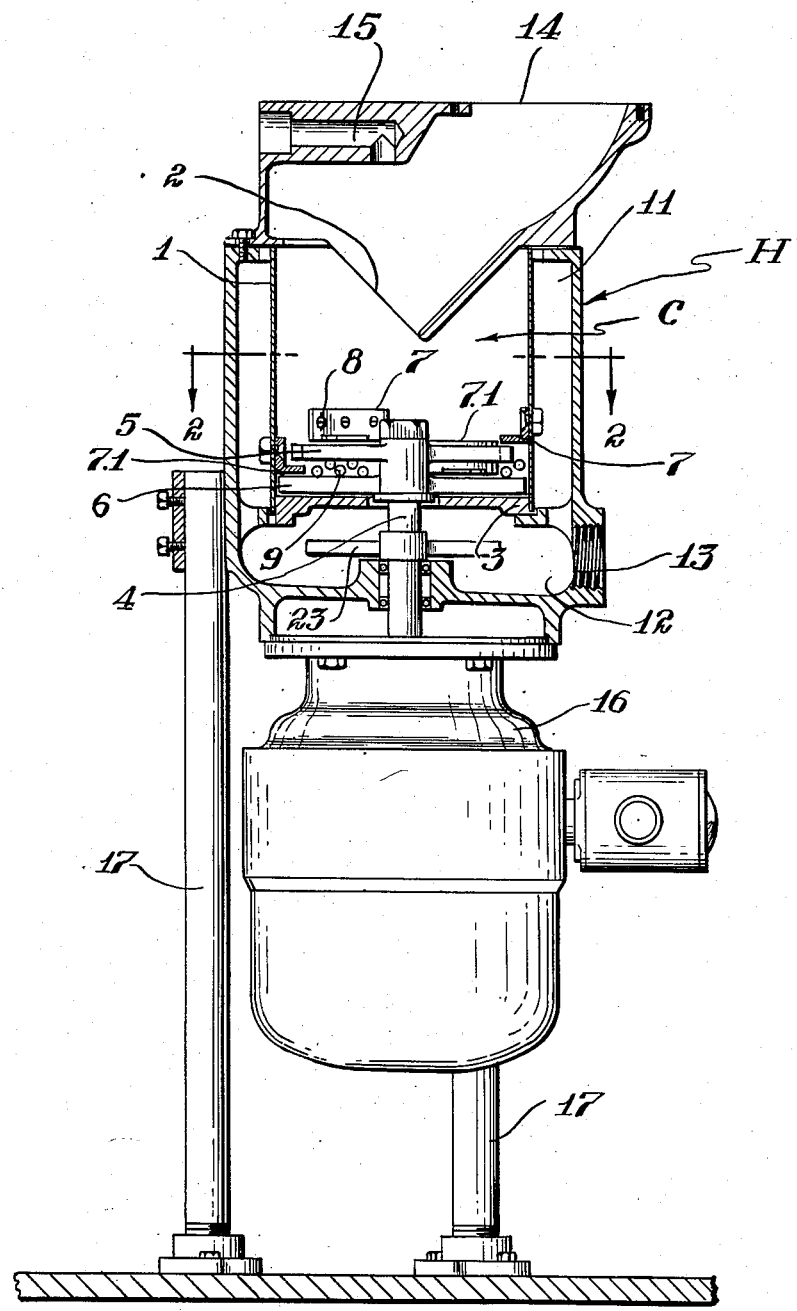
Fig. 1 is a side elevation, partly in cross-section, of the device.

The disposer device of the present invention has for its principal parts a housing H having enclosed therein a comminuting chamber C, comprising a perforate, cylindrical screen 1, having a substantially open top 2 and solid bottom 3. Axially positioned and rotatably mounted within said chamber is a shaft 4 upon the upper end of which is secured an offset rotor bar assembly having rotor bars 5 and 6 of different lengths. In effective comminuting relation with said bars are spaced and staggered cutters 7 (upper) and 7.1 (lower) secured to the inner wall of said perforate screen, either by means of screws 8 (shown in Figs. 1 and 4), rivets or a weld (not shown). The cutters 7 and 7.1 are symmetrically spaced and staggered so that as the upper and shorter blade 5 rotates, the cutters are alternately above and below the end of said blade. The perforations 9 are round with approximately ¼" diameter, uniformly spaced and tapered inwardly at 45° as at 10, thereby causing the inner edges to define a multiplicity of cutting edges to aid in the reduction of the solid matter. The ends of the lower and longer rotor bars 6 are removed from the inner wall of the perforate screen 1 a distance less than the average diameter of the perforations 9 and thereby shear away solid waste, pieces at a time, by forcing the same against the cutting edges defined by the inwardly tapered perforation. Upper rotor bar 5 leads the lower bar 6 by approximately 30° in the direction of rotation which is counterclockwise. This permits rotor bar 5 and cutters 7 and 7.1 to act upon the solid matter first, after which the partially reduced matter is further acted upon by lower rotor 6 and the perforations 9. The bars and cutters shear the waste in a horizontal plane while the bar end and perforations shear in a vertical plane, so that the waste is cut in two planes at right angles to each other. As the solid matter is reduced to a proper size it flows and is forced through the perforations into air space 11 which separates the perforate cylindrical screen 1 and the inner wall of the housing H. Thereafter the matter drops into a receiving area 12 from where it enters a sewer outlet 13 for final disposition.

Built into the top of the preferred device is a hopper 14 of such size as to afford large quantities of matter which are to be comminuted easy access to the comminuting chamber, thus enabling the machine to function steadily on a maximum work load. In addition a water inlet 15 permits water to feed in a steady stream into the solid matter and comminuting chamber.

Beneath the receiving area 12 is a motor 16 for driving the rotatable shaft 4. The device is mounted upon three metal legs 17 which are provided with means for securely fastening them to the floor.

A U-shaped impeller 18, the arms of which are inclined outwardly, may be positioned on the axially positioned rotatable shaft 4 above rotor blade 5. The arms of the impeller are beveled to points 19 and 20 and are also beveled inwardly to provide downwardly facing inclined faces 21 and 22 forming cutting edges. The cutting edges reduce large bodies of waste which would otherwise bridge between the shaft and the cylinder side wall. The faces 21 and 22 have a propeller action which draws or impels waste down to the rotor bars. Preferably the impeller is offset about 30° in the direction of rotation from the upper rotor blade whereby, in addition to preventing matter such as grapefruit rind and the like from "riding" on top of the rotatable shaft, it functions to initially reduce the solid matter before it is acted upon by the upper rotor blade 5 and cutters 7 and 7.1.

Another optional feature is an agitator 23 driven by rotatable shaft 4 in the receiving area 12. This agitation functions to keep the comminuted waste in the receiving area from solidifying and further serves to keep the waste flowing freely into the sewer outlet.

In operation the water and waste are permitted to enter the comminuting chamber through their respective inlets. The solid matter is then first acted upon by the impeller, if the latter has been attached, and is broken up and shunted downwardly where it is acted upon by the cutters and the upper rotor bar and the cutting edges of the perforations. Having thus been further divided, the waste drops and becomes subject to the cutting action produced by the lower rotor bar and the cutting edges of the perforations. The lower bar being spaced a distance from the inside wall, less than the diameter of the perforations, reduces the larger particles by continually forcing portions of them against the cutting edges of the perforations, and also reduces the smaller particles which could pass through the perforation by the same action. In addition the proximity of the rapidly rotating bar to the wall forces the reduced waste through the openings at the faster rate. The comminuted solid matter is removed from the chamber through the perforations which uniformly cover approximately the lower half of cylindrical screen into the uniform space between the chamber and the inside wall of the housing. This material then drops or runs into the receiving area beneath the chamber from where it enters a sewer outlet.

It is, of course, obvious that the screen may be perforated throughout its height as opposed to being perforate for only a portion thereof, or being perforate only to the upper cutters. However, it has been determined that, as a practical matter, the cylinder need not be perforated above the upper rotor blade for most comminuting operations.

Further the perforations themselves need not be perfectly round, but may, in fact, be in the nature of small squares, rectangles or the like, preferably tapered inwardly, with their inner edges defining a multiplicity of vertical cutting edges. The inside diameters of the perforations may vary over relatively wide limits as can the distance between any two center points of the substantially uniformly spaced perforations. Suitable diameters are from one-quarter to one-half inch, while suitable distances between center points are from three-eighths to three-quarters of an inch apart.

The walls of the comminuting chamber are of substantial thickness, i. e., of a thickness that lends durability to the chamber and provides cutting edges when the perforations are made therein. Since the perforations may be tapered inwardly at any angle which produces a cutting edge, it is obvious that, as a practical matter, the thickness of the walls are a matter of choice, a preferred wall thickness being five-sixteenths of an inch.

The bars are preferably elongate and rectangular, and the sides thereof may be tapered slightly inwardly from the center to each end so that the ends are of less width than the center. Preferably the rotor bars are an integral assembly or cast piece, provided with a keyway or other suitable means for being positioned. Upon a shaft, and which is held on to said shaft by a locking nut above said assembly on the shaft.

It should be noted that the cutting or teeth portion of the cutters need not be of the particular size or configuration disclosed so long as they provide an effective horizontal cutting action. In addition the number of such teeth may be that number sufficient to provide an effective cutting relation with the upper rotor blade and will depend upon the size of the teeth and the cylinder.

As a modification of the head or top portion of the preferred device which contains a built-in hopper and water inlet, round funnel-shaped hoppers (not shown) may be substituted which have diameters at their receiving end of as much as eighteen inches or more. Hoppers of this type permit a larger and steadier flow of solid waste and are particularly useful in pre-packaging industries for lettuce, celery, spinach, tomatoes, fruits and the like, since the size and hardness of the waste is substantially uniform.

The disposer has general application and may be used in homes, restaurants, hotels, institutions and markets, it has been found particularly advantageous when employed in vegetable packing houses where there are large quantities of waste and space is at a premium.

It should be understood that the present disclosure is for the purpose of illustration only and that the invention includes all modifications and equivalents which fall within the scope of the appended claims.

I claim:

1. In a disposer device, a comminuting chamber, comprising an open top, closed bottom perforated cylindrical screen, the walls of which are of substantial thickness and the perforations of which have uniformly smaller inner than outer diameters, an axially positioned rotatable shaft upon which are secured offset rotor bars of different lengths, means for rotating said shaft and bars, spaced and staggered cutters secured to and projecting horizontally from the inner walls of the screen, said cutters being so staggered and spaced as to be in effective cutting relation with a shorter rotor bar, the multiplicity of cutting edges of the perforations cooperating with a longer bar to further comminute the solid matter and cause said further reduced matter to be pushed by said longer bar through a screen to a receiving area from where it enters a sewer outlet.

2. In a disposer device, a comminuting chamber comprising an open top solid bottom perforated cylindrical screen having walls of substantial thickness, and perforations which are round, of substantially uniform diameter and tapered inwardly, an axially positioned rotatable shaft upon which are mounted offset rotor bars, the upper bar being shorter than the lower, spaced and staggered cutters below and above said upper bar in effective cutting relation therewith when the bars are in rotation, said lower and longer bar being spaced a distance from the inner wall less than the diameters of the perforations therein, thereby further reducing the solid matter already comminuted by the upper rotor bar in cooperation with the cutters by subjecting the matter to the action of the cutting edges of the perforations, prior to it being forced out of the cylinder into a receiving area.

3. In a disposer device, a comminuting chamber comprising an open top perforated cylindrical screen having a solid bottom and walls of substantial thickness, the perforations of which are substantially round and tapered inwardly, the inner edges of which define a multiplicity of cutting edges, an axially positioned rotatable shaft upon which are mounted offset rotor bars, a U-shaped impeller mounted upon said shaft and above the upper bar, at least four spaced and staggered cutters secured to the inner wall of the screen, in effective comminuting relation with the upper rotor bar, the ends of the lower rotor bar being spaced from the inner wall of the screen a distance less than the diameters of the perforations, thereby cooperating with the cutting edges of said perforations to aid in reducing the solid matter, prior to its removal from the chamber through the perforations.

4. Disposer for garbage and the like, comprising housing, a comminuting chamber enclosed in said housing, said chamber comprising an open top closed bottom cylindrical screen, the perforations of which are substantially round, uniformly spaced and tapered outwardly, a water inlet and hopper feeding into said chamber, offset rotor bars of different length mounted upon an axially positioned rotatable shaft, spaced and staggered cutters secured to the perforation portion of the inner wall of said screen in effective comminuting relation with the upper and shorter rotor bar when said bar is in rotation, the lower and longer rotor bar being spaced a distance from the inner wall, less than the diameters of the perforations therein, means for rotating the shaft whereby the solid matter is reduced first by the upper rotor blade and cutters and then further reduced by the inner edges of the tapered openings through which it is forced into a receiving area, agitating means for maintaining the reduced solid matter in a liquid suspension in said receiving area prior to its discharge from the housing.

5. In a disposer device, a comminuting chamber, comprising an open top, closed bottom perforated cylindrical screen, the walls of which are of substantial thickness and the perforations of which have uniformly smaller inner than outer diameters, an axially positioned rotatable shaft upon which are secured offset rotor bars, means for rotating said shaft and bars, spaced and staggered cutters secured to and projecting horizontally from the inner walls of the screen, said cutter being so staggered and spaced as to be in effective cutting relation with an upper rotor bar, the multiplicity of cutting edges of the perforations cooperating with a lower bar to further comminute the solid matter and cause said further reduced matter to be pushed by said lower bar through said perforations to a receiving area from where it enters a sewer outlet.

6. In a waste disposer, a cylindrical comminuting chamber having a bottom wall and a side wall, a motor driven shaft extending axially into said chamber, a cutting bar rotatably mounted on said shaft in said chamber, means forming a cutting edge extending inwardly from said side wall in cooperative relation with a leading edge of said bar to comminute solid matter between said edges when said bar is rotated, said side wall having perforations therethrough forming a plurality of additional cutting edges and the end of said bar extending into close relation to said additional cutting edges further to comminute solid matter between said end and perforations and expel the comminuted matter from the chamber, and an impeller having outwardly and upwardly inclined propeller faces forming cutting edges rotating in and extending through a zone bridging the top of said shaft and the side wall of said chamber, thereby to reduce waste bodies tending to bridge said shaft and side wall and force said bodies down to said bar.

References Cited in the file of this patent

UNITED STATES PATENTS

| | | |
|---|---|---|
| 1,794,214 | Thurm | Feb. 24, 1931 |
| 1,977,955 | Robinson | Oct. 23, 1934 |
| 2,536,929 | Hammell | Jan. 2, 1951 |
| 2,594,635 | Gamaunt | Apr. 29, 1952 |
| 2,627,075 | Benson | Feb. 3, 1953 |
| 2,679,981 | Eisinga | June 1, 1954 |

FOREIGN PATENTS

| | | |
|---|---|---|
| 427,647 | Great Britain | Apr. 29, 1935 |
| 833,172 | Germany | Mar. 20, 1952 |